(12) United States Patent
Nomura

(10) Patent No.: US 6,731,881 B2
(45) Date of Patent: May 4, 2004

(54) DEVICE FOR TRANSMITTING AND RECEIVING OPTICAL SIGNALS

(75) Inventor: Rintaro Nomura, Tokyo (JP)

(73) Assignee: NEC Corporation, Tokyo (JP)

( * ) Notice: Subject to any disclaimer, the term of this patent is extended or adjusted under 35 U.S.C. 154(b) by 589 days.

(21) Appl. No.: 09/725,890

(22) Filed: Nov. 30, 2000

(65) Prior Publication Data

US 2001/0002864 A1 Jun. 7, 2001

(30) Foreign Application Priority Data

Dec. 1, 1999 (JP) .......................................... 11-342651

(51) Int. Cl.[7] .............................................. H04B 10/00
(52) U.S. Cl. ....................... 398/135; 398/139; 398/140; 398/137; 398/41; 398/42; 398/102; 398/182; 398/192; 398/194; 398/195; 398/202; 398/208; 398/209; 398/213; 385/88; 385/89; 385/92; 385/93
(58) Field of Search ................................ 398/135, 139, 398/140, 137, 41, 42, 202, 182, 208, 192, 209, 194, 213, 195, 102; 385/88, 92, 93, 89

(56) References Cited

U.S. PATENT DOCUMENTS

| | | | |
|---|---|---|---|
| 5,317,441 A | * | 5/1994 | Sidman ........................ 359/113 |
| 5,677,779 A | * | 10/1997 | Oda et al. .................... 359/152 |
| 5,859,725 A | * | 1/1999 | Sugiya ........................ 359/341 |
| 6,106,160 A | * | 8/2000 | Kikuchi et al. ............... 385/88 |

FOREIGN PATENT DOCUMENTS

| | | | | |
|---|---|---|---|---|
| JP | 56-62436 | 5/1981 | | |
| JP | 3-242054 | 10/1991 | | |
| JP | 5-183520 | 7/1993 | | |
| JP | 5-289120 | 11/1993 | | |
| JP | 7-336303 | 12/1995 | | |
| JP | 9-181676 | 7/1997 | | |
| JP | 409181676 A | * | 7/1997 | .................. 359/152 |
| JP | 11-27210 | 1/1999 | | |
| JP | 11-27215 | 1/1999 | | |
| JP | 2923884 | 5/1999 | | |
| JP | 11-271546 | 10/1999 | | |

OTHER PUBLICATIONS

Japanese Office Action dated May 15, 2003, with partial English translation.

* cited by examiner

Primary Examiner—Leslie Pascal
Assistant Examiner—Hanh Phan
(74) Attorney, Agent, or Firm—McGinn & Gibb, PLLC (57) ABSTRACT

A device for interactively transmitting optical signals in a first wavelength and receiving optical signals in a second wavelength both through a one-core optical fiber, includes a first photodiode that converts a received optical signal into a first electric signal, a second photodiode that converts an optical signal into a second electric signal, a first amplifier connected between the second light-electricity signal converter and the coherent light remover, a second amplifier connected to the second light-electricity signal converter, and a differential amplifier that subtracts the second electric signal from the first electric signal.

30 Claims, 6 Drawing Sheets

CIRCUIT FOR DETECTING WHETHER OPTICAL SIGNAL IS INTERRUPTED

DEVICE FOR TRANSMITTING AND RECEIVING OPTICAL SIGNALS

BACKGROUND OF THE INVENTION

1. Field of the Invention

The invention relates to an asynchronous transfer mode-passive optical network (ATM-PON) system, more particularly to a device for transmitting and receiving optical signals used in an ATM-PON system, and most particularly to removal of a coherent light in such a device.

2. Description of the Related Art

Figure 1:
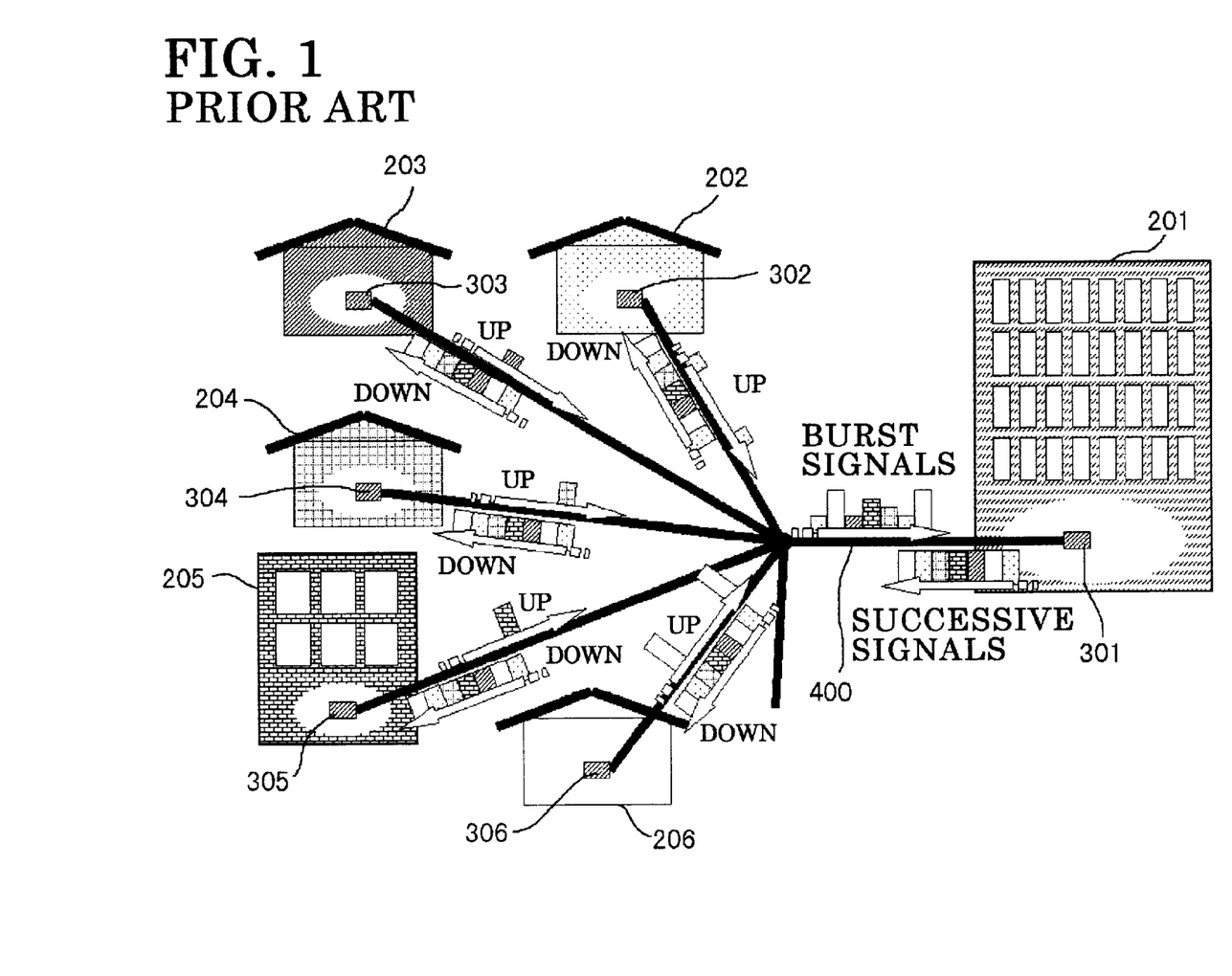
FIG. 1 illustrates an asynchronous transfer mode-passive optical network (ATM-PON) system.

FIG. 1 illustrates an ATM-PON system. In the ATM-PON system, optical signals are interactively transmitted between a station 201 and subscribers 202 to 206. The station 201 is connected to each of the subscribers 202 to 206 through one-core optical fibers 400.

Herein, optical signals successively transmitted from the station 201 to the subscribers 202 to 206 are called down signals, and burst signals transmitted from each of the subscribers 202 to 206 to the station 201 is called up signals. The up and down signals are designed to have different wavelengths from each other.

Devices 301 to 306 equipped in the station 201 and each of the subscribers 202 to 206 are designed to be able to not only transmit an optical signal, but also receive an optical signal.

Each of the devices 301 to 306 is designed to include a laser diode (LD) from which an optical signal is transmitted.

Figure 2:
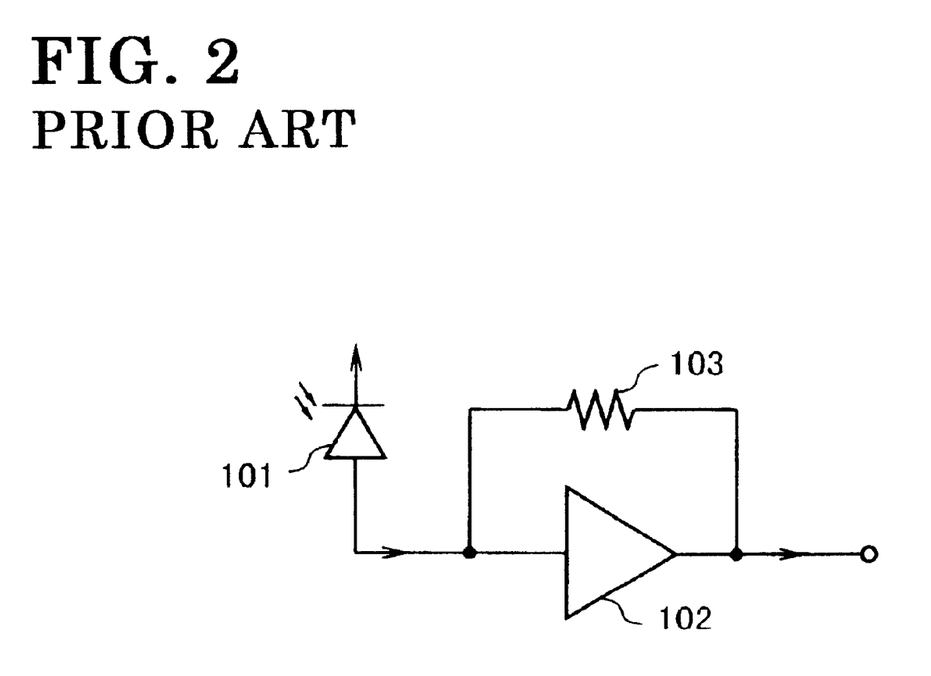
FIG. 2 is a circuit diagram of a circuit for receiving an optical signal, equipped in a conventional device for transmitting and receiving optical signals.

FIG. 2 is a circuit diagram of a circuit included in each of the devices 301 to 306 for receiving optical signals. The illustrated circuit is comprised of a photodiode 101, a trans-impedance amplifier 102 electrically connected in series to the photodiode 101, and a feedback resistor 103 electrically connected in parallel to the trans-impedance amplifier 102.

The photodiode 101 converts a received optical signal into an electric signal. The trans-impedance amplifier 102 amplifies and converts the electric signal transmitted from the photodiode 101, into a voltage signal. The feedback resistor 103 defines a gain of the trans-impedance amplifier 102.

The above-mentioned devices 301 to 306 are accompanied with a problem that when the laser diode transmits an optical signal, the optical signal to be transmitted strays in the devices 301 to 306, and enters the circuit illustrated in FIG. 2 as a coherent light, resulting in deterioration in photosensitivity in the devices 301 to 306.

When the devices 301 to 306 are of an optical waveguide, in particular, the above-mentioned coherent light exerts much harmful influence on the circuit illustrated in FIG. 2, resulting in more remarkable deterioration in photosensitivity in the devices 301 to 306.

In order to minimize deterioration in photosensitivity in the devices 301 to 306 in their operation, it is necessary to remove a coherent light component from a received optical signal.

In order to remove a coherent light component from a received optical signal, optical countermeasure has been conventionally applied to an optical waveguide. For instance, Japanese Unexamined Patent Publication No. 10-54917 has suggested the formation of a slit in an optical waveguide for interrupting a coherent light from reaching the optical waveguide.

However, it was quite difficult or almost impossible to sufficiently remove a coherent light only by means of optical countermeasures.

Japanese Unexamined Patent Publication No. 5-289120 has suggested an optical waveguide device including a device for combining optical signals to one another and separating optical signals into respective optical signals, an optical directional coupler, and an optical circuit substrate on which the device and the optical directional coupler are formed in monolithic.

Japanese Patent No. 2923884 (Japanese Unexamined Patent Publication No. 10-311875) has suggested a device including a semiconductor laser emitting a laser beam, a laser receiver receiving the laser beam emitted from the semiconductor laser, a filter positioned between the laser receiver and the semiconductor laser and allowing the laser beam to pass therethrough, the filter removing background noises, an angle adjuster adjusting an inclination angle of the filter to change an incident angle of the laser beam into the filter, and a controller controlling the angle adjuster such that the laser beam passes through the filter at a maximum, in accordance with an output signal transmitted from the laser receiver. The controller includes an oscillator, a multiplier multiplying an output of the oscillator by an output of the laser receiver, a differential amplifier amplifying a difference between an output of the multiplier and a reference voltage, and a manipulator overlapping an output of the differential amplifier with an output of the oscillator, and providing a command to the angle adjuster.

Japanese Unexamined Patent Publication No. 11-27215 has suggested an optical communication module to be used in a parent station radially connected to a plurality of child stations through optical devices and making interactive communication with each of the child stations in time division multiplex by switching a mode between a receipt mode and a transmission mode. The parent station includes first output means for transmitting a first reset signal in accordance with a difference in a signal receiving level in the receipt mode, second output means for transmitting a second reset signal when the transmission mode is switched to the receipt mode, and ATC means for automatically setting a threshold level when the first or second reset signal is received.

SUMMARY OF THE INVENTION

In view of the above-mentioned problem in the prior art, it is an object of the present invention to provide a device for interactively transmitting optical signals and receiving optical, which is capable of removing a coherent light by which photosensitivity in the device would be deteriorated.

In one aspect of the present invention, there is provided a device for interactively transmitting optical signals in a first wavelength and receiving optical signals in a second wavelength both through a one-core optical fiber, including (a) a first light-electricity signal converter which converts a received optical signal into a first electric signal, (b) a second light-electricity signal converter which converts an optical signal to be transmitted, into a second electric signal, and (c) a coherent light remover which subtracts a level of the second electric signal from a level of the first electric signal to remove a coherent light included in the received optical signal.

There is further provided a device for interactively transmitting optical signals in a first wavelength and receiving optical signals in a second wavelength both through a one-core optical fiber, including (a) a first light-electricity signal converter which converts a received optical signal into a first electric signal, (b) a second light-electricity signal converter which converts an optical signal to be transmitted, into a second electric signal, (c) a delay line which adjusts a phase difference between the first and second electric signals such that the first and second electric signals are in phase with each other, and (d) a coherent light remover which subtracts a level of the second electric signal from a level of the first electric signal to remove a coherent light included in the received optical signal.

For instance, the delay line is positioned between the first light-electricity signal converter and the coherent light remover when the first electric signal reaches the coherent light remover earlier than the second electric signal.

As an alternative, the delay line is positioned between the second light-electricity signal converter and the coherent light remover when the second electric signal reaches the coherent light remover earlier than the first electric signal.

It is preferable that the device further includes a first variable gain amplifier electrically connected in series between the first light-electricity signal converter and the coherent light remover.

For instance, the first variable gain amplifier is comprised of a first impedance amplifier electrically connected in series to the first light-electricity signal converter, and a first variable resistor electrically connected in parallel to the first impedance amplifier.

It is preferable that the device further includes a second variable gain amplifier electrically connected in series between the second light-electricity signal converter and the coherent light remover, the second variable gain amplifier equalizing a level of an output signal transmitted from the second light-electricity signal converter, to a signal level of a coherent light included in the received optical signal.

For instance, the second variable gain amplifier is comprised of a second impedance amplifier electrically connected in series to the second light-electricity signal converter, and a second variable resistor electrically connected in parallel to the second impedance amplifier.

It is preferable that the device further includes a third variable gain amplifier electrically connected in series to the second light-electricity signal converter, and in parallel with the second variable gain amplifier.

For instance, the third variable gain amplifier is comprised of a third impedance amplifier electrically connected in series to the second light-electricity signal converter, and a third variable resistor electrically connected in parallel to the third impedance amplifier.

For instance, the coherent light remover may be comprised of a differential amplifier.

For instance, the above-mentioned device is of a waveguide type.

It is preferable that the device further includes (d) an optical waveguide connected to the one-core optical fiber, (e) a filter for selecting a wavelength, the received optical signal being transmitted through the filter and being received at the first light-electricity signal converter, and (f) a laser diode emitting a laser beam which is coupled to the optical waveguide, and then, output through the optical fiber, the second light-electricity signal converter being located at the rear of the laser diode and receiving a backlight from the second light-electricity signal converter.

There is still further provided a device for interactively transmitting optical signals in a first wavelength and receiving optical signals in a second wavelength both through a one-core optical fiber, including (a) a first photodiode which converts a received optical signal into a first electric signal, (b) a second photodiode which converts an optical signal to be transmitted, into a second electric signal, and (c) a differential amplifier which subtracts a level of the second electric signal from a level of the first electric signal to remove a coherent light included in the received optical signal.

There is yet further provided a device for interactively transmitting optical signals in a first wavelength and receiving optical signals in a second wavelength both through a one-core optical fiber, including (a) a first photodiode which converts a received optical signal into a first electric signal, (b) a second photodiode which converts an optical signal to be transmitted, into a second electric signal, (c) a delay line which delays the first electric signal such that the first and second electric signals are in phase with each other, and (d) a differential amplifier which subtracts a level of the second electric signal from a level of the first electric signal to remove a coherent light included in the received optical signal.

For instance, the delay line is positioned between the first photodiode and the differential amplifier when the first electric signal reaches the differential amplifier earlier than the second electric signal.

As an alternative, the delay line is positioned between the second photodiode and the differential amplifier when the second electric signal reaches the differential amplifier earlier than the first electric signal.

It is preferable that the device further includes a first trans-impedance amplifier which amplifies the first electric signal and converts the first electric signal into a first voltage signal, and a second trans-impedance amplifier which amplifies the second electric signal and converts the second electric signal into a second voltage signal.

It is preferable that the device further includes a first variable feedback resistor electrically connected in parallel to the first trans-impedance amplifier, and a second variable feedback resistor electrically connected in parallel to the second trans-impedance amplifier.

It is preferable that the device further includes a third trans-impedance amplifier electrically connected in series to the second photodiode, and in parallel with the second trans-impedance amplifier, the third trans-impedance amplifier amplifying the first output signal and converting the first output signal into a third voltage signal.

It is preferable that the device further includes a third variable feedback resistor electrically connected in parallel to the first trans-impedance amplifier, and a second variable feedback resistor electrically connected in parallel to the second trans-impedance amplifier.

It is preferable that the device further includes (a) an optical waveguide connected to the one-core optical fiber, (b) a filter for selecting a wavelength, the received optical signal being transmitted through the filter and being received at the first photodiode, and (c) a laser diode emitting a laser beam which is coupled to the optical waveguide and then output through the optical fiber, the second photodiode being located at the rear of the laser diode and receiving a backlight from the second photodiode.

In another aspect of the present invention, there is provided a method of removing a coherent light in a device for interactively transmitting optical signals in a first wavelength and receiving optical signals in a second wavelength both through a one-core optical fiber, including the steps of (a) converting a received optical signal into a first electric signal, (b) converting an optical signal to be transmitted, into a second electric signal, and (c) subtracting a level of the second electric signal from a level of the first electric signal to remove a coherent light included in the received optical signal.

There is further provided a method of removing a coherent light in a device for interactively transmitting optical signals in a first wavelength and receiving optical signals in a second wavelength both through a one-core optical fiber, including the steps of (a) converting a received optical signal into a first electric signal, (b) converting an optical signal to be transmitted, into a second electric signal, (c) adjusting a phase difference between the first and second electric signals such that the first and second electric signals are in phase with each other, and (d) subtracting a level of the second electric signal from a level of the first electric signal to remove a coherent light included in the received optical signal.

For instance, the first electric signal is delayed in the step (c) when the first electric signal is faster than the second electric signal.

As an alternative, the second electric signal is delayed in the step (c) when the second electric signal is faster than the first electric signal.

It is preferable that the method further includes the step of equalizing a level of the first or second electric signal to a signal level of a coherent light included in the received optical signal.

It is preferable that the method further includes the steps of converting the first electric signal into a first voltage signal, and converting the second electric signal into a second voltage signal.

The advantages obtained by the aforementioned present invention will be described hereinbelow.

In accordance with the above-mentioned present invention, only a coherent light included a received optical signal is detected and remove. Accordingly, it is possible to electrically remove a coherent light without applying an optical countermeasure to the device.

In particular, it is quite important for the device including an optical waveguide to prevent deterioration in photosensitivity, caused by a coherent light. Since the present invention removes a coherent light by a simply structured circuit, this is quite effective for the device including an optical waveguide.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 3:
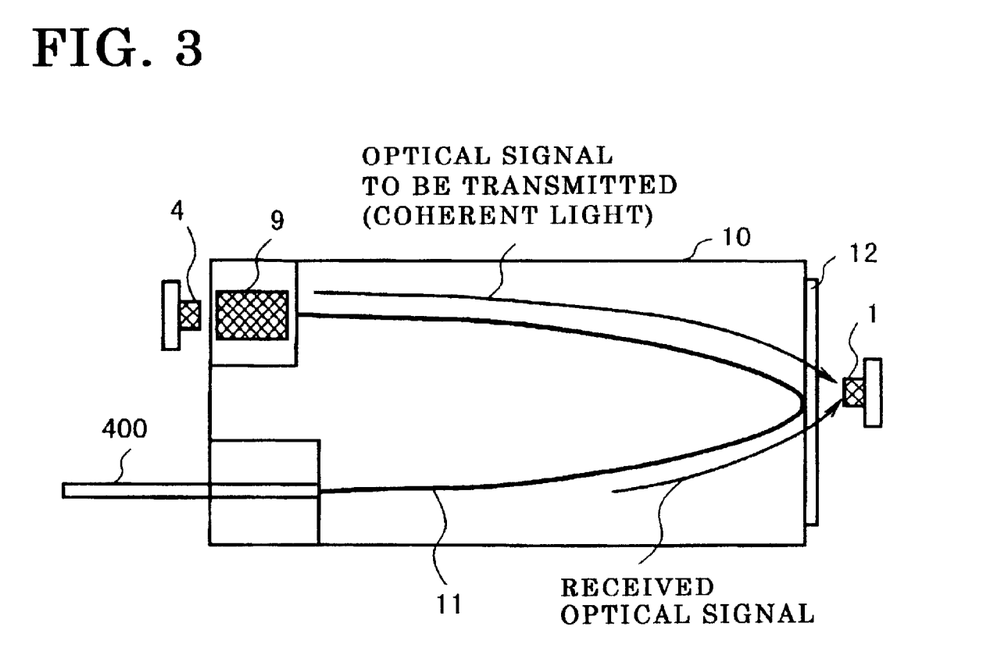
FIG. 3 is a device for transmitting and receiving optical signals, including an optical waveguide, in accordance with an embodiment of the present invention.

FIG. 3 illustrates a device for transmitting and receiving optical signals, including an optical waveguide, in accordance with the embodiment.

The device illustrated in FIG. 3 is equipped in the station 201 and each of the subscribers 202 to 206 in the ATM-PON system illustrated in FIG. 1. The device includes an optical waveguide element 10 in which an optical waveguide 11 is arranged, a filter 12 for selecting a wavelength, a first photodiode (PD) 1, a laser diode (LD) 9, and a second photodiode 4. The optical waveguide 11 is connected to a one-core optical fiber 400.

An optical signal having a first wavelength is transmitted to the optical waveguide 11 through the one-core optical fiber 400, and an optical signal having a second wavelength is received at the optical waveguide 11 through the one-core optical fiber 400.

An optical signal received through the one-core optical fiber 400 is introduced into the optical waveguide 11 at one of input ports of the optical waveguide 11.

The received optical signal introduced into the optical waveguide 11 passes through the filter 12 and is received at the first photodiode 1.

A laser beam emitted from the laser diode 9, which is to be transmitted from the device through the one-core optical fiber 400, is introduced into the optical waveguide 11 at the other input port of the optical waveguide 11.

The optical signal having been emitted from the laser diode 9 and introduced into the optical waveguide 11 is reflected at the filter 12, advances through the optical waveguide 11, and is connected to and output from the one-core optical fiber 400.

When the optical signals emitted from the laser diode 9 are introduced into the optical waveguide 11, some of the optical signals cannot be connected to the optical waveguide 11. Such optical signals scatter in the optical waveguide element 10, and are received at the photodiode 1 together with a received optical signal as a coherent light against the received optical signal.

The second photodiode 4 is located at the rear of the laser diode 9 to receive a backlight emitted from the laser diode 9.

The backlight emitted from the laser diode 9 and received at the second photodiode 4 has the same waveform as that of an optical signal to be output from the device. Since a coherent light included in the received optical signal consists of a light emitted from the laser diode 9, it is possible to detect only a coherent light by means of the second photodiode 4.

Figure 4:
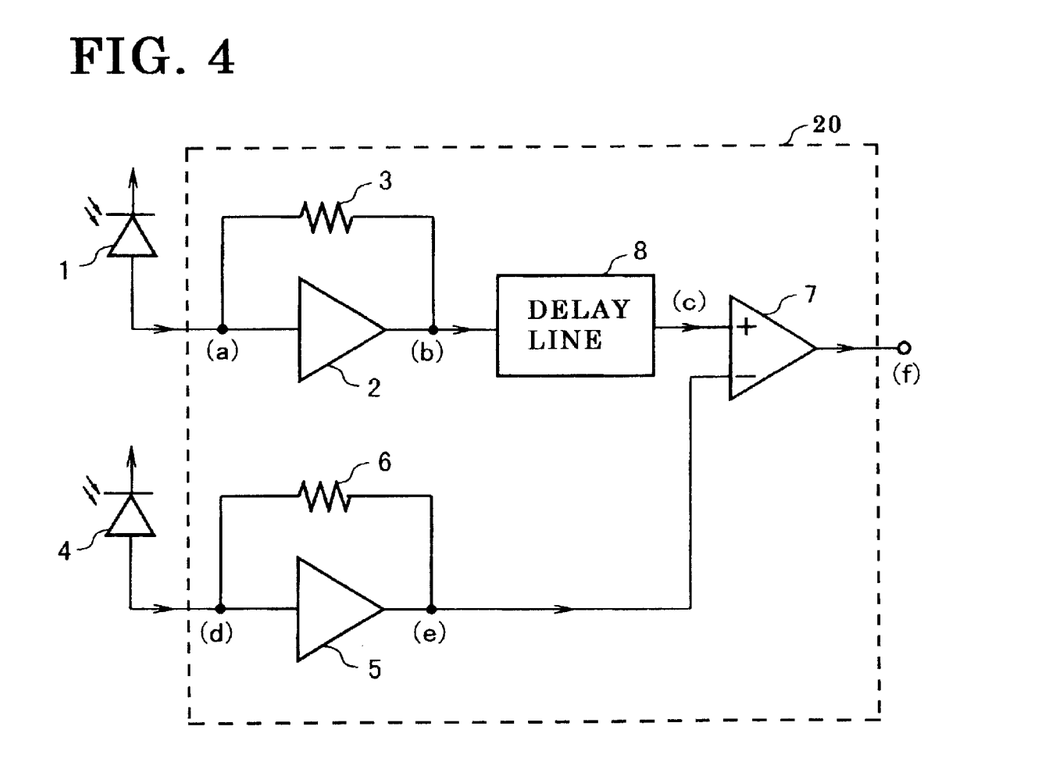
FIG. 4 is a block diagram of a circuit for removing a coherent light, to be applied to the device illustrated in FIG. 3.

FIG. 4 is a block diagram of a circuit 20 for removing a coherent light. This circuit is applied to the device in accordance with the embodiment.

The illustrated circuit 20 is comprised of a first trans-impedance amplifier 2 electrically connected in series to the first photodiode 1, a first feedback resistor 3 electrically connected in parallel to the first trans-impedance amplifier 2, a second trans-impedance amplifier 5 electrically connected in series to the second photodiode 4, a second feedback resistor 6 electrically connected in parallel to the second trans-impedance amplifier 5, a differential amplifier 7 receiving output signals transmitted from the first and second trans-impedance amplifiers 2 and 5, and a delay line 8 electrically connected between the first trans-impedance amplifier 2 and the differential amplifier 7.

The first photodiode 1 converts a received optical signal into a first electric signal, which is in turn introduced into the first trans-impedance amplifier 2.

The first trans-impedance amplifier 2 converts the thus received first electric signal into a first voltage signal. A resistance of the first feedback resistor 3 defines a gain of the first trans-impedance amplifier 2 at which the first trans-impedance amplifier 2 converts an electric signal into a voltage signal.

The second photodiode 4 receives only a coherent light, as mentioned earlier, and converts the received coherent light into a second electric signal. The second electric signal is introduced into the second trans-impedance amplifier 5, which converts the second electric signal into a second voltage signal. A resistance of the second feedback resistor 6 defines a gain of the second trans-impedance amplifier 5 at which the second trans-impedance amplifier 5 converts an electric signal into a voltage signal.

The first voltage signal transmitted from the first trans-impedance amplifier 2 is introduced into the delay line 8. The delay line 8 adjusts a phase difference between the optical signal received at the first photodiode 1 and the optical signal received at the second photodiode 4.

An output signal transmitted from the delay line 8 and the second voltage signal transmitted from the second trans-impedance amplifier 5 are both introduced into the differential amplifier 7. The differential amplifier 7 subtracts a level of the second electric signal from a level of the first electric signal, and transmits an output signal indicative of the result.

Though the delay line 8 is positioned between the first trans-impedance amplifier 2 and the differential amplifier 7 in the circuit 20 illustrated in FIG. 4, where the delay line 8 should be positioned is determined in dependence on a structure of the device and other conditions.

For instance, if a signal received at the second photodiode 4 reaches the differential amplifier 7 earlier than a signal received at the first photodiode 1, the delay line 8 is positioned between the second trans-impedance amplifier 5 and the differential amplifier 7.

In contrast, if a signal received at the first photodiode 1 reaches the differential amplifier 7 earlier than a signal received at the second photodiode 4, the delay line 8 is positioned between the first trans-impedance amplifier 2 and the differential amplifier 7, as shown in FIG. 4.

As mentioned above, the second photodiode 4 receives only a backlight from the laser diode 9, that is, a coherent light. Hence, it is possible to detect and remove a coherent light component by subtracting the second electric signal level from the first electric signal level by means of the differential amplifier 7.

Figure 5:
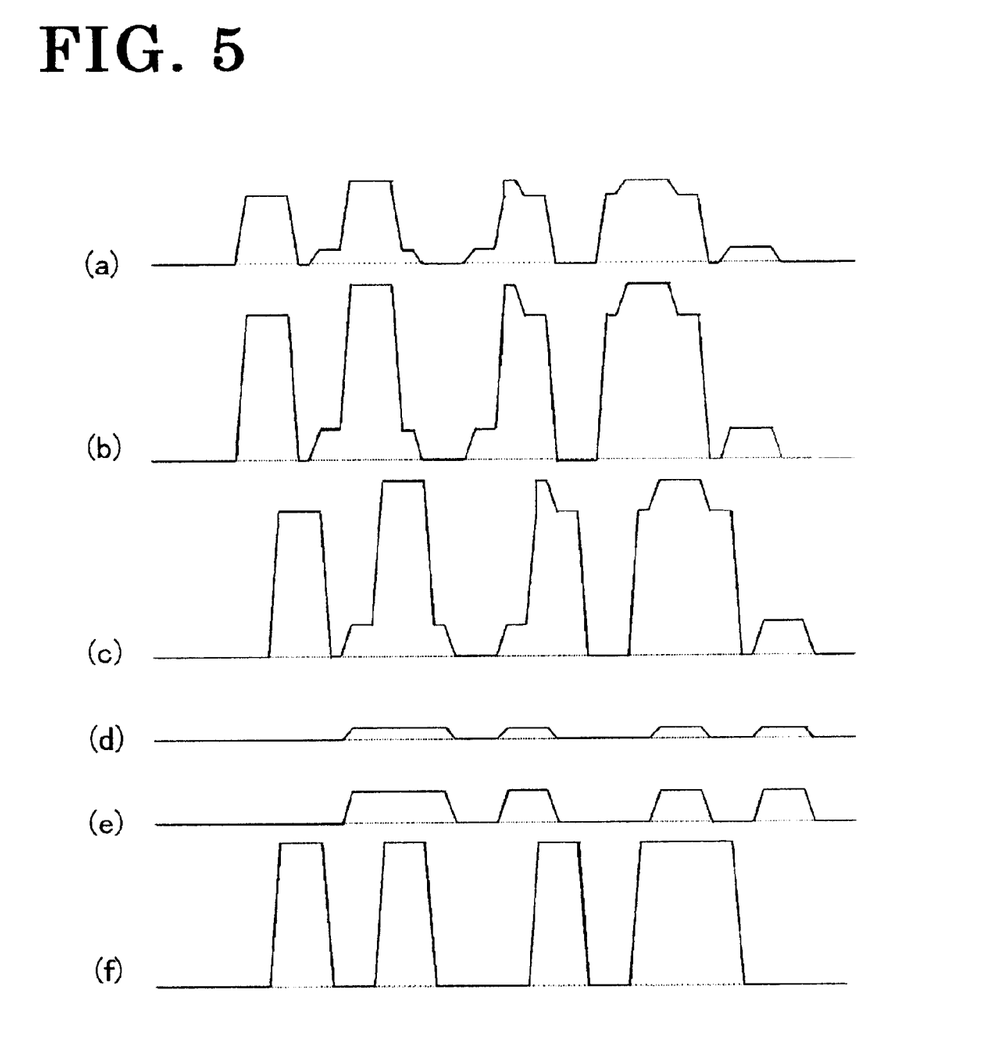
FIG. 5 is a timing chart showing an operation of the circuit illustrated in FIG. 4.

FIG. 5 is a timing chart showing an operation of the circuit 20 illustrated in FIG. 4.

FIG. 5-(*a*) illustrates a signal waveform of the first electric signal transmitted from the first photodiode 1. Since the signal received at the first photodiode 1 includes a coherent light emitted from the laser diode 9, the signal waveform in FIG. 5-(*a*) is deformed.

FIG. 5-(*b*) illustrates a signal waveform of the first voltage signal transmitted from the first trans-impedance amplifier 2. The gain at which the first electric signal is converted into the first voltage signal is defined by the first feedback resistor 3.

FIG. 5-(*c*) illustrates a signal waveform of the signal transmitted from the delay line 8. As illustrated in FIG. 5-(*c*), a phase of the first voltage signal illustrated in FIG. 5-(*b*) is delayed such that the first voltage signal is in phase with the second voltage signal illustrated in FIG. 5-(*e*).

FIG. 5-(*d*) illustrates a signal waveform of the second electric signal transmitted from the second photodiode 4. This signal waveform is a signal waveform of a light transmitted from the laser diode 9, that is, a coherent light.

FIG. 5-(*e*) illustrates a signal waveform of the second voltage signal transmitted from the second trans-impedance amplifier 5. The gain at which the second electric signal is converted into the second voltage signal is defined by the second feedback resistor 6 such that a level of the signal transmitted from the delay line 8, illustrated in FIG. 5-(*c*), is equal to a level of the second voltage signal transmitted from the second trans-impedance amplifier 5, including a coherent light, illustrated in FIG. 5-(*e*).

A delay in a phase brought by the delay line 8 is determined such that the signal illustrated in FIG. 5-(*c*) is in phase with the signal illustrated in FIG. 5(*e*).

FIG. 5-(*f*) illustrates a signal waveform of the signal transmitted from the differential amplifier 7.

By subtracting the signal waveform illustrated in FIG. 5-(*e*) from the signal waveform illustrated in FIG. 5-(*c*), it is possible to obtain a signal waveform including no coherent light.

Figure 6:
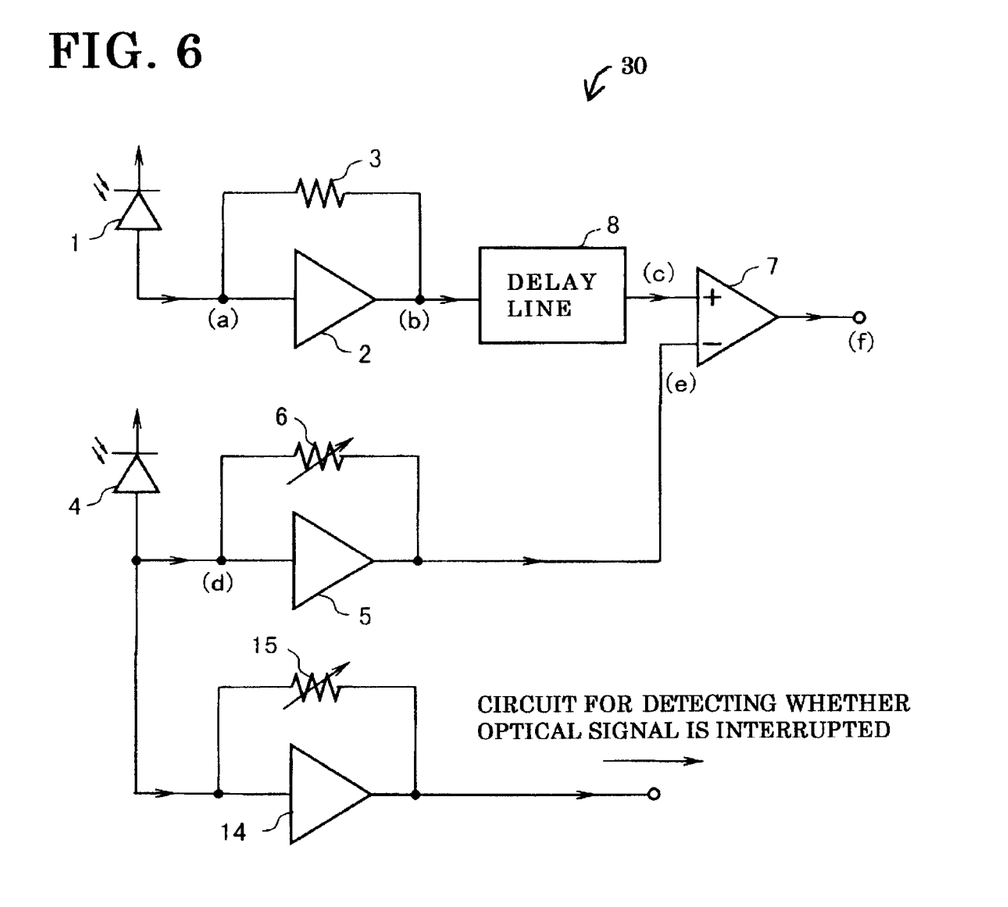
FIG. 6 is another block diagram of a circuit for removing a coherent light, to be applied to the device illustrated in FIG. 3.

FIG. 6 is a block diagram of a circuit 30 for removing a coherent light. This circuit 30 is applied to the device in accordance with the embodiment.

The illustrated circuit 30 is comprised of a first trans-impedance amplifier 2 electrically connected in series to the first photodiode 1, a first feedback resistor 3 electrically connected in parallel to the first trans-impedance amplifier 2, a second trans-impedance amplifier 5 electrically connected in series to the second photodiode 4, a second variable feedback resistor 6 electrically connected in parallel to the second trans-impedance amplifier 5, a differential amplifier 7 receiving output signals transmitted from the first and second trans-impedance amplifiers 2 and 5, a delay line 8 electrically connected between the first trans-impedance amplifier 2 and the differential amplifier 7, a third trans-impedance amplifier 14 electrically connected in series to the second photodiode 4, and a third variable feedback resistor 15 electrically connected in parallel to the third trans-impedance amplifier 14.

In brief, the circuit 30 illustrated in FIG. 6 further includes the third trans-impedance amplifier 14 and the third variable feedback resistor 15 in comparison with the circuit 20 illustrated in FIG. 4.

The third trans-impedance amplifier 14 transmits an output signal, for instance, to a circuit (not illustrated) for detecting whether an optical output is interrupted.

If a monitor photodiode is to be used for detecting whether an optical output is interrupted, the second photodiode 4 can act also as such a monitor photodiode. That is, it is possible to apply the circuit 30 to a circuit having to include a monitor photodiode, without newly adding a photodiode to the circuit.

It is of course possible for the circuit 30 to detect whether an optical output is interrupted, without adding a photodiode thereto.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-342651 filed on Dec. 1, 1999 including specification, claims, drawings and summary is incorporated herein by reference in its entirety.

What is claimed is:

1. A device for interactively transmitting optical signals in a first wavelength and receiving optical signals in a second wavelength both through a one-core optical fiber, comprising:

a first light-electricity signal converter that converts a received optical signal into a first electric signal;

a second light-electricity signal converter that converts an optical signal to be transmitted, into a second electric signal; and a coherent light remover that subtracts a level of said second electric signal from a level of said first electric signal a first amplifier connected between said second light-electricity signal converter and said coherent light remover: and a second amplifier connected to said second light-electricity signal converter.

2. The device as set forth in claim 1, further comprising a third amplifier electrically connected in series between said first light-electricity signal converter and said coherent light remover.

3. The device as set forth in claim 2, wherein said third amplifier comprises an impedance amplifier electrically connected in series to said first light-electricity signal converter, and a variable resistor electrically connected in parallel to said impedance amplifier.

4. The device as set forth in claim 1, wherein said first amplifier comprises a first variable gain amplifier that equalizes a level of an output signal transmitted from said second light-electricity signal converter, to a signal level of a coherent light included in said received optical signal.

5. The device as set forth in claim 4, wherein said first variable gain amplifier comprises an impedance amplifier electrically connected in series to said second light-electricity signal converter, and a variable resistor electrically connected in parallel to said impedance amplifier.

6. The device as set forth in claim 4, wherein said second amplifier is connected to said second light-electricity signal converter in parallel with said first amplifier.

7. The device as set forth in claim 6, wherein said second amplifier comprises an impedance amplifier electrically connected in series to said second light-electricity signal converter, and a variable resistor electrically connected in parallel to said impedance amplifier.

8. The device as set forth in claim 1, wherein said coherent light remover comprises a differential amplifier.

9. The device as set forth in claim 1, wherein said device comprises a waveguide type device.

10. The device as set forth in claim 1, further comprising:

an optical waveguide connected to said one-core optical fiber;

a filter for selecting a wavelength, said received optical signal being transmitted through said filter and being received at said first light-electricity signal converter; and a laser diode emitting said optical signal that is transmitted to said optical waveguide, and then, output through said optical fiber, said second light-electricity signal converter being located at the rear of said laser diode and receiving said optical signal that is transmitted from said laser diode.

11. A device for interactively transmitting optical signals in a first wavelength and receiving optical signals in a second wavelength both through a one-core optical fiber, comprising:

a first light-electricity signal converter that converts a received optical signal into a first electric signal;

a second light-electricity signal converter that converts an optical signal to be transmitted, into a second electric signal;

a delay line that adjusts a phase difference between said first and second electric signals such that said first and second electric signals are in phase with each other;

a coherent light remover that subtracts a level of said second electric signal from a level of said first electric signal and a first amplifier connected between said second light-electricity signal converter and said coherent light remover; and a second amplifier connected to said second light-electricity signal converter.

12. The device as set forth in claim 2, wherein said delay line is positioned between said first light-electricity signal converter and said coherent light remover when said first electric signal reaches said coherent light remover earlier than said second electric signal.

13. The device as set forth in claim 11, wherein said delay line is positioned between said second light-electricity signal converter and said coherent light remover when said second electric signal reaches said coherent light remover earlier than said first electric signal.

14. The device as set forth in claim 11, further comprising:

an optical waveguide connected to said one-core optical fiber;

a filter for selecting a wavelength, said received optical signal being transmitted through said filter and being received at said first light-electricity signal converter; and a laser diode emitting said optical signal that is transmitted to said optical waveguide, and then, output through said optical fiber, said second light-electricity signal converter being located at the rear of said laser diode and receiving said optical signal that is transmitted from said laser diode.

15. A device for interactively transmitting optical signals in a first wavelength and receiving optical signals in a second wavelength both through a one-core optical fiber, comprising:

a first photodiode that converts a received optical signal into a first electric signal;

a second photodiode that converts an optical signal to be transmitted, into a second electric signal; and a differential amplifier that subtracts a level of said second electric signal from a level of said first electric signal a first amplifier connected between said second photodiode and said differential amplifier; and a second amplifier connected to said second photodiode.

16. The device as set forth in claim 15, further comprising:

an optical waveguide connected to said one-core optical fiber;

a filter for selecting a wavelength, said received optical signal being transmitted through said filter and being received at said first photodiode; and a laser diode emitting said optical signal to be transmitted to said optical waveguide and then output through said optical fiber, said second photodiode being located at the rear of said laser diode and receiving said optical signal to be transmitted from said laser diode.

17. A device for interactively transmitting optical signals in a first wavelength and receiving optical signals in a second wavelength both through a one-core optical fiber, comprising:

a first photodiode that converts a received optical signal into a first electric signal;

a second photodiode that converts an optical signal to be transmitted, into a second electric signal;

a delay line that delays said first electric signal such that said first and second electric signals are in phase with each other;

a differential amplifier that subtracts a level of said second electric signal from a level of said first electric signal a first amplifier connected between said second photodiode and said differential amplifier; and a second amplifier connected to said second photodiode.

18. The device as set forth in claim 17, wherein said delay line is positioned between said first photodiode and said differential amplifier when said first electric signal reaches said differential amplifier earlier than second electric signal.

19. The device as set forth in claim 17, wherein said delay line is positioned between said second photodiode and said differential amplifier when said second electric signal reaches said differential amplifier earlier than said first electric signal.

20. The device as set forth in claim 17, further comprising a third amplifier that amplifies said first electric signal and converts said first electric signal into a first voltage signal, and wherein said first amplifier amplifies said second electric signal and converts said second electric signal into a second voltage signal.

21. The device as set forth in claim 20, wherein said second amplifier is connected in parallel with said first amplifier, and said second amplifier amplifies said second electric signal and converts said second electric signal into a third voltage signal.

22. The device as set forth in claim 21, further comprising a first variable feedback resistor electrically connected in parallel to said third amplifier, and a second variable feedback resistor electrically connected in parallel to said first amplifier.

23. The device as set forth in claim 20, further comprising a first variable feedback resistor electrically connected in parallel to said third amplifier, and a second variable feedback resistor electrically connected in parallel to said first amplifier.

24. The device as set forth in claim 17, further comprising:

an optical waveguide connected to said one-core optical fiber;

a filter for selecting a wavelength, said received optical signal being transmitted through said filter and being received at said first photodiode; and a laser diode emitting said optical signal to be transmitted to said optical waveguide and then output through said optical fiber, said second photodiode being located at the rear of said laser diode and receiving said optical signal to be transmitted from said laser diode.

25. A method of removing a coherent light in a device for interactively transmitting optical signals in a first wavelength and receiving optical signals in a second wavelength both through a one-core optical fiber, comprising:

converting a received optical signal into a first electric signal;

converting an optical signal to be transmitted, into a second electric signal;

amplifying said second electric signal using a first amplifier;

amplifying said second electric signal using a second amplifier; and subtracting a level of said amplified second electric signal from said first amplifier from a level of said first electric signal.

26. A method of removing a coherent light in a device for interactively transmitting optical signals in a first wavelength and receiving optical signals in a second wavelength both through a one-core optical fiber, comprising:

converting a received optical signal into a first electric signal;

converting an optical signal to be transmitted, into a second electric signal;

adjusting a phase difference between said first and second electric signals such that said first and second electric signals are in phase with each other; and amplifying said second electric signal using a first amplifier;

amplifying said second electric signal using a second amplifier; and subtracting a level of said amplified second electric signal from said first amplifier from a level of said first electric signal.

27. The method as set forth in claim 26, wherein said first electric signal is delayed when said second electric signal is faster than said first electric signal.

28. The method as set forth in claim 26, wherein said second electric signal is delayed when said second electric signal is faster than said first electric signal.

29. The method as set forth in claim 26, further comprising equalizing a level of said first or second electric signal to a signal level of a coherent light included in said received optical signal.

30. The method as set forth in claim 26, further comprising converting said first electric signal into a first voltage signal, and converting said second electric signal into a second voltage signal.

* * * * *